Nov. 16, 1965 H. A. FREEMAN 3,217,458
REFRACTORY BRICK STRUCTURE AND METHOD OF FABRICATING SAME
Filed Aug. 10, 1962

INVENTOR.
HARVEY A. FREEMAN
BY
ATTORNEY

United States Patent Office 3,217,458
Patented Nov. 16, 1965

3,217,458
REFRACTORY BRICK STRUCTURE AND
METHOD OF FABRICATING SAME
Harvey A. Freeman, Pittsburgh, Pa., assignor to Harbison-Walker Refractories Company, Pittsburgh, Pa., a corporation of Pennsylvania
Filed Aug. 10, 1962, Ser. No. 216,182
8 Claims. (Cl. 52—612)

This invention relates to refractory structures such as a furnace wall, roof, and other portions of a furnace exposed to high temperatures. The invention has particular utility in such as basic open hearth roofs to obtain stability and strength, without the use of oxidizable metal casing structures. Oxidation of metal casings has been previously advisable to overcome spalling of basic brick and, also, by in situ fusion between the brick and cases, to provide better strength. However, the metal cases tend to reduce the refractoriness of an open hearth roof or wall because of their considerably lower melting point (expansion of the metal cases upon oxidation, in some installations, is also undesirable). Further, the expense of casing some brick is considerable and some brick are very difficult to case.

Accordingly, it is an object of this invention to provide improved furnace structure. It is another object of this invention to provide an improved composite refractory structure having good spalling resistance and strength, without using mortar, oxidizable cases, or the like.

It is yet another object of this invention to provide an improved open hearth roof structure.

Briefly, in one embodiment, an open hearth furnace roof constructed according to the concepts of this invention is fabricated of a plurality of high purity, magnesia brick and a plurality of high purity alumina brick, assembled in a checkerboard pattern, in which each brick abuts a brick of dissimilar compositions, i.e. each magnesia brick abuts an alumina brick. According to this invention, the magnesia brick are preferably of high purity, i.e. above about 90% MgO, by weight, on the basis of an oxide analysis. The alumina brick are at least 90% $Al_2O_3$, by weight, and on the basis of an oxide analysis.

A better understanding, further objects and other advantages of this invention will become readily apparent to those skilled in the art from a study of the following detailed description, with reference to the drawings. In these drawings.

For this invention, a preferred alumina shape would be one fabricated according to the teaching of United States patent application, Serial No. 847,865, filed October 22, 1959, for "Alumina Refractory" now U.S. Patent 3,067,050; and a preferred high purity magnesia shape is one fabricated of the magnesia grain, manufactured according to the teachings of United States patent application, Serial No. 847,864, filed October 22, 1959, for "Production of Dead Burned Magnesia", now U.S. Patent 3,060,000. Both of these applications are owned by the same assignee as the present invention.

Figure 1:
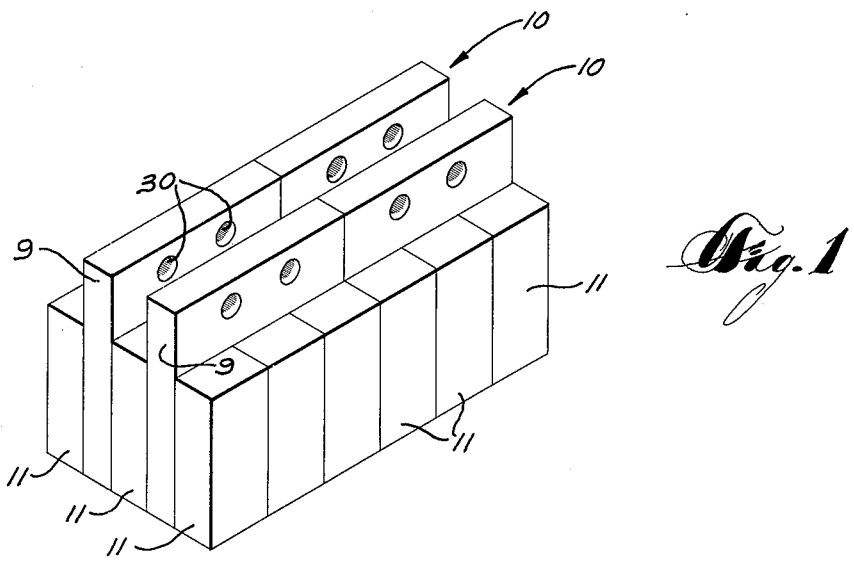
FIG. 1 is a prospective view of an exemplary arrangement of refractory shapes, within the concepts of this invention.

In one embodiment, the magnesia shapes are standard 9" straights (a nominal 9 x 4½ x 2½" brick), and the alumina shapes are nominally 9 x 2 x 2" in thickness. In another exemplary embodiment, the alumina shapes are plates, nominally 13½ x 12 x 2" thick, so that three magnesia brick can abut each 13½ x 12" face of each alumina plate. Such an arrangement is shown in FIG. 1, where the 13½ x 12 x 2" thick alumina plates 10 are sandwiched between spaced groups of three magnesia brick 11, with a portion 9 of each plate 10 extending beyond the cold face of the magnesia brick 11. Of course, the plates 10 can be 9" in width to accommodate a pair of brick 11. Alternatively, the plates can be larger to accommodate larger groups of magnesia brick.

Figure 3:
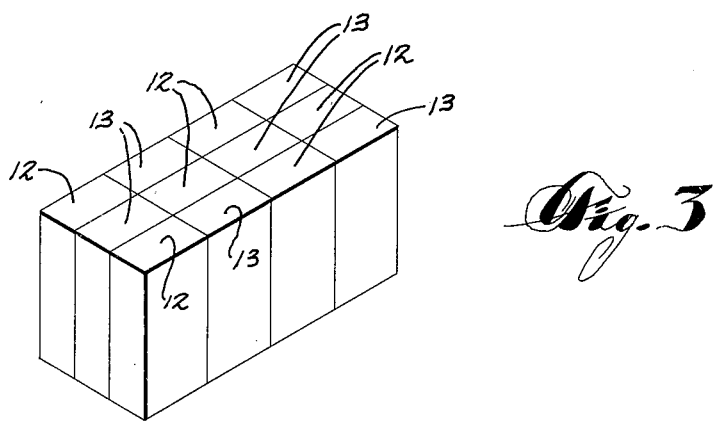
FIG. 3 is an alternative checkerboard arrangement, within the concepts of this invention.

An alternative and more conventional checkerboard arrangement is shown in FIG. 3, in which each side of magnesia brick 12, within the checkerboard structure, is abutted by an alumina brick of similar shape.

The faces of the alumina and magnesia shapes, which are used to fabricate checkerboard furnace structures according to this invention, must be relatively clean surfaces, free of foreign materials such as dirt, refractory sand, or the like. Likewise, they must be relatively smooth surfaces, and free of depressions—such as brands stamps or the like.

In one test, four test units were constructed, in which a high purity magnesia brick was placed in face to face contact with an alumina brick. The brick were of the type described above. In two of the test's units, a clean and smooth face of an alumina brick was abutted against a clean and smooth face of a magnesia brick. In a third unit, the brand name depressions formed in the faces of the brick were abutted. In the fourth unit, very fine sand, marking chalk and marking ink were placed on a smooth 9 x 4½" face of a magnesia brick, and a smooth and clean 9 x 4½" face of an alumina brick was placed on top. The four units were subsequently placed in a furnace.

Four additional test units were assembled in the same manner and placed in a second furnace. Each furnace was heated to 2900° F. A 25 p.s.i. load was exerted on all test units, except for one of the units in each furnace, in which the smooth and clean 9 x 4½" faces of the alumina and magnesia brick abutted. The first furnace had a reducing atmosphere, i.e. there was fed insufficient oxygen as to stoichiometrically react with the fuel; and the second furnace had an oxidizing atmosphere, in which a stoichiometric excess of oxygen was fed to the furnace. The foregoing conditions were maintained for five hours.

The four units from the first furnace were cooled, removed and examined. The unit in which the brand name depressions were abutted were easily separated from each other. The brick of the unit in which clean and smooth faces abutted each other, and which were under the 25 p.s.i. load, were joined together. The bond of this joinder was of sufficient strength as to require 165 p.s.i. in shear to rupture.

The test unit, which had the marking chalk, marking ink and sand applied to the otherwise clean and smooth surface of the magnesia brick, showed some joinder to the alumina brick, but only in areas where the chalk, ink and sand has not been applied. Further, such bonds as did occur were easily broken by twisting the brick with the hands. The unit, which had no pressure exerted, had no bond of any sort. The four units from the second furnace, in which an oxidizing atmosphere was maintained, gave results similar to those obtained in the reducing atmosphere. However, the strength of the bond between the brick of the unit under pressure and having smooth and clean faces abutting, was not as great as the similar unit heated under reducing conditions.

Figure 2:
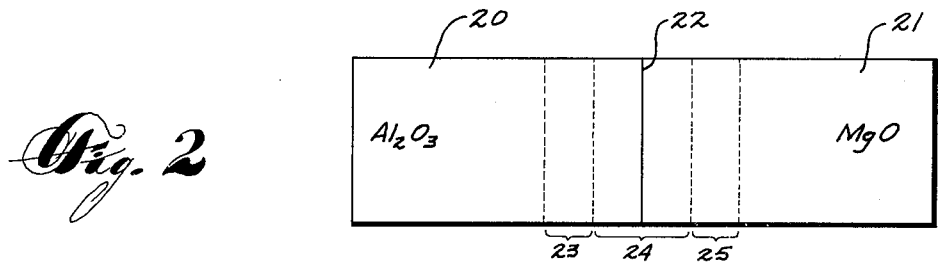
FIG. 2 is a schematic diagram of the interface between a pair of the shapes of the arrangement of FIG. 1, after service.

Test units, in which adhesion or joinder was pronounced, were subjected to spectrochemical, X-ray diffraction and microscopic examination to determine the character of the bonded interface. The results of these tests are diagrammatically shown in FIG. 2. In FIG. 2, block 20 is the high alumina brick, and block 21 the high magnesia brick. Their interface 22 is shown in FIG. 2 for simplicity of drawing description, but was not readily discernible to the naked eye after testing. The area about the joint 22 was found to be composed of three rather distinct zones 23, 24 and 25. Zone 23 was substantially entirely alumina, magnesium aluminate spinel and silicate. Zone 25 was composed almost entirely of magnesia, forsterite and other silicates. The zone 24 was substantially entirely a phase consisting of an intimate admixture of magnesium aluminate spinel-silicate, with that part adjacent zone 25 tending to show some separate grains of magnesium aluminum spinel and silicate. From the foregoing, it appears that the silica content of the two brick (there being about 2% $SiO_2$ in brick 21 and about 10% in the $Al_2O_3$ brick 20), migrated towards the joint 22, and interreacted with each other to form a single phase.

In actual field tests, alumina and magnesia brick, of the type above described, were placed in face to face contact, subjected to reducing conditions and pressure over a long period of time, and exhibited much stronger bonding than the laboratory test units. It, thus, appears that the zone of magnesium aluminate spinel-silicate becomes more pronounced and, thus, stronger with time.

The foregoing laboratory and field testing established that a satisfactory monolithic furnace structure may be obtained, with a checkerboard pattern of alumina and magnesia shapes, without the use of mortars or metal cases. However, the abutting faces of the alumina and the magnesia shapes should be relatively clean and free of foreign materials, must be free of depressions, and pressure must be exerted at elevated temperatures to promote bond formation.

The arrangement of the brick in FIG. 1 is the preferred embodiment of this invention, particularly for basic open hearth furnaces, since non-basic alumina units 10 are kept to a minimum. Also, the primary purpose of the alumina units or plates 10 is merely to bond together the magnesia brick 11 to form a unitary monolithic structure. The spinel-silicate zone, which is formed along the abutting faces of the alumina and magnesia shapes, substantially eliminates spalling losses. It appears the high strength alumina plates retain fracturing portions of the hot face of the magnesia brick in place, and do not allow them to drop into the furnace.

Any suitable suspension arrangement may be used, according to this invention. For example, for an open hearth roof, the cold end of the shapes may be formed according to the teachings of the United States Patent No. 2,997,008, to Snellman. In the case of such as plates 10, in which they extend a distance beyond the cold end of the brick 11, a series of apertures 30 may be formed therethrough. Thus, in installation, a series of the apertures 30 in sequential plates 10 are aligned and, supporting rods or the like, are passed therethrough to support the plates.

Having thus described the invention in detail, and with sufficient particularity as to enable those skilled in the art to practice it, what is desired to have protected by letters patent is set forth in the following claims.

I claim:

1. That method of constructing a refractory structure or component thereof which comprises the steps of fabricating said structure of a plurality of uncased refractory shapes, said plurality of shapes being comprised of a group of fired refractory high alumina shapes and a group of fired refractory magnesia shapes, there being available silica present in each of the plurality of shapes, said refractory alumina and refractory magnesia shapes being arranged in a checkerboard pattern in which each of the refractory magnesia shapes is placed with at least one side surface in contiguous face to face contact with a side surface of a refractory alumina shape, the respective surfaces of the alumina and magnesia shapes which are in face to face contact being substantially smooth and free of foreign materials, exposed surfaces of said refractory structure or component thereof thereby being comprised of exposed ends of said refractory alumina and refractory magnesia shapes to form said checkerboard pattern, subjecting the structure to elevated temperatures and pressure for a time period sufficient for at least a portion of the silica content of abutting magnesia and alumina shapes to migrate towards each other and react and mix with each other and with a portion of the magnesia and alumina material of the abutting shapes to form a phase consisting of an intimate admixture of magnesium aluminate spinel and silicates.

2. The method of claim 1 in which substantially all of the magnesia shapes are abutted on four sides by an alumina shape.

3. The method of claim 1 in which the alumina shapes are at least about 90% $Al_2O_3$, by weight, and on the basis of an oxide analysis, and the magnesia shapes are at least about 97% MgO, by weight, and on the basis of an oxide analysis.

4. That method of constructing a roof for a basic open hearth furnace which comprises the steps of suspending a plurality of uncased refractory shapes in side by side relation, said plurality of shapes being comprised of a group of fired refractory high alumina shapes and a group of fired refractory magnesia shapes, there being available silica present in each of the plurality of shapes, said refractory alumina and refractory magnesia shapes being arranged in a checkerboard pattern in which each of the refractory magnesia shapes is placed with at least one side surface in contiguous face to face contact with a side surface of a refractory alumina shape, the respective surfaces of the alumina and magnesia shapes which are in face to face contact being substantially smooth and free of foreign materials, exposed surfaces of said open hearth furnace roof thereby being comprised of exposed ends of said refractory alumina and refractory magnesia shapes to form said checkerboard pattern, subjecting the furnace roof to elevated temperatures and pressure for a time period sufficient for at least a portion of the silica content of abutting magnesia and alumina shapes to migrate towards each other and react and mix with each other and with a portion of the magnesia and alumina material of the abutting shapes to form a phase consisting of an intimate admixture of magnesium aluminate spinel and silicates.

5. The method of claim 4 in which the furnace is subjected to a reducing atmosphere.

6. In refractory structures and components thereof fabricated of a plurality of uncased refractory shapes, said plurality of shapes being comprised of a group of fired refractory high alumina shapes and a plurality of fired refractory magnesia shapes, there being available silica present in each shape, said alumina shapes and magnesia shapes being arranged in checkerboard pattern in which the magnesia shapes have at least one surface abutted in contiguous face to face contact with a surface of an alumina shape and in which ends of the alumina and magnesia shapes are exposed to form said checkerboard pattern, there being an intimate admixture of magnesium aluminate spinel and silicate formed across said contiguous abutted surfaces thereby joining together adjacent alumina and magnesia shapes.

7. A refractory structure or component thereof comprised of a plurality of uncased refractory shapes, said plurality of shapes being comprised of a plurality of fired refractory high alumina plates and a plurality of fired refractory magnesia brick, said plates and brick arranged in a checkerboard pattern in which each of the magnesia brick has at least one side surface in contiguous face to face contact with an adjacent surface of an alumina plate, exposed end surfaces of said plates and brick forming said checkerboard pattern, respective surfaces of the said alumina plates and magnesia brick which are in face to face contact being substantially smooth and free of foreign materials.

8. A refractory structure or component thereof comprised of a plurality of uncased refractory shapes, said plurality of shapes being comprised of a plurality of fired refractory high alumina plates and a plurality of fired refractory magnesia brick, said plates and brick arranged in a checkerboard pattern in which a plurality of pairs of magnesia brick have a pair of exposed surfaces in contiguous face to face contact with one surface of an alumina plate, exposed end surfaces of said plates and brick forming said checkerboard pattern, respective surfaces of the said alumina plates and magnesia brick which are in face to face contact being substantially smooth and free of foreign materials.

References Cited by the Examiner

UNITED STATES PATENTS

| | | | |
|---|---|---|---|
| 1,448,684 | 3/1923 | Beecher et al. | 52—443 |
| 1,934,263 | 11/1933 | Hacks | 266—43 |
| 2,154,813 | 11/1933 | Heuer | 266—43 |
| 2,236,920 | 4/1941 | Robertson | 110—99 |
| 2,547,322 | 4/1951 | Heuer | 110—99 |
| 2,757,623 | 8/1956 | Heuer | 110—99 |
| 3,038,423 | 6/1962 | Oswald | 110—99 |
| 3,140,955 | 7/1964 | Alper | 106—62 X |
| 3,155,534 | 11/1964 | Brunch | 106—62 X |

FRANK L. ABBOTT, *Primary Examiner.*

JACOB L. NACKENOFF, CHARLES E. O'CONNELL, *Examiners.*